(12) United States Patent
Kollipara et al.

(10) Patent No.: US 10,979,556 B2
(45) Date of Patent: Apr. 13, 2021

(54) DETECTING AND REPORTING USER TRIGGERED CALL DROPS

(71) Applicant: NetScout Systems, Inc, Westford, MA (US)

(72) Inventors: Anilkumar Kollipara, Allen, TX (US); James Eric Wilson, Richardson, TX (US)

(73) Assignee: NetScout Systems, Inc, Westford, MA (US)

( * ) Notice: Subject to any disclaimer, the term of this patent is extended or adjusted under 35 U.S.C. 154(b) by 311 days.

(21) Appl. No.: 15/950,890

(22) Filed: Apr. 11, 2018

(65) Prior Publication Data

US 2019/0320063 A1   Oct. 17, 2019

(51) Int. Cl.
*H04M 1/82* (2006.01)
*H04L 29/06* (2006.01)
*H04M 7/00* (2006.01)

(52) U.S. Cl.
CPC .......... *H04M 1/82* (2013.01); *H04L 65/1069* (2013.01); *H04M 7/0081* (2013.01)

(58) Field of Classification Search
CPC ............... H04L 41/0631; H04L 65/608; H04L 65/1006; H04L 65/1069; H04M 3/2218; H04M 1/82; H04M 7/0081; H04W 24/08
See application file for complete search history.

(56) References Cited

U.S. PATENT DOCUMENTS

| | | | |
|---|---|---|---|
| 8,861,691 B1* | 10/2014 | De ......................... | H04M 15/41 379/111 |
| 10,091,349 B1* | 10/2018 | Rao ...................... | H04M 3/5175 |
| 10,581,664 B1* | 3/2020 | Peng ................... | H04L 41/5009 |
| 2007/0201454 A1* | 8/2007 | Weir ....................... | H04L 12/66 370/356 |
| 2007/0288630 A1* | 12/2007 | De Noia ................. | H04L 65/80 709/224 |
| 2010/0128860 A1* | 5/2010 | Kung ..................... | H04L 43/16 379/112.01 |
| 2010/0165976 A1 | 7/2010 | Khan et al. | |
| 2014/0016763 A1* | 1/2014 | Li ...................... | H04M 15/8011 379/114.2 |
| 2014/0211787 A1* | 7/2014 | Noldus ............... | H04L 65/1083 370/352 |
| 2017/0230851 A1* | 8/2017 | Ko ......................... | H04W 24/08 |
| 2018/0270346 A1* | 9/2018 | Donnenwirth ...... | H04M 3/2218 |
| 2018/0287901 A1* | 10/2018 | Bisada .................. | H04L 41/069 |
| 2018/0309616 A1* | 10/2018 | Kollipara ............ | H04L 41/5067 |

* cited by examiner

*Primary Examiner* — Lisa Hashem
(74) *Attorney, Agent, or Firm* — Locke Lord LLP; Scott D. Wofsy; Christopher J. Capelli

(57) ABSTRACT

A method for detecting user triggered call drops includes identifying one or more user terminated calls from a plurality of monitored calls. Signaling information associated with the identified user terminated calls is correlated with media channel information associated with the identified user terminated calls. A determination is made if termination of the one or more of the identified user terminated calls is related to quality of media across corresponding media channels. A predefined cause code is assigned to the one or more of the identified user terminated calls, in response to determining that the termination of the one or more of the identified user terminated calls is related to the quality of media across the corresponding media channels.

16 Claims, 3 Drawing Sheets

DETECTING AND REPORTING USER TRIGGERED CALL DROPS

FIELD OF THE INVENTION

Embodiments of the present invention relate generally to communication systems, and specifically to detecting and reporting user triggered call drops in Voice over IP (VoIP) networks.

BACKGROUND OF THE INVENTION

Voice telecommunications has traditionally been conducted via dedicated telephone networks utilizing telephone switching offices and either wired or wireless connections for transmitting the voice signal between the users' telephones. Such telecommunications, which use the Public Switched Telephone Network (PSTN), may be referred to as circuit committed communications. VoIP network provides an alternative voice telecommunication means which use discrete packets digitized voice information to transmit the voice signals. The packets are transmitted either over the public Internet or within intranets. The advantage to VoIP is that a single network can be utilized to transmit data packets as well as voice and video packets between users, thereby greatly simplifying communication.

Typical VoIP network infrastructure includes gateways, gatekeepers, proxy servers, soft switches, session border controllers, and the like. Due to optimization of network resources and to particular designs, network operators may choose to integrate functionality of the separate components with one another such that multiple infrastructure components can be collocated on one physical component.

SIP protocol describes how to set up Internet telephone calls, videoconferences, and other multimedia connections. SIP can establish two-party sessions (ordinary telephone calls), multiparty sessions (where everyone can hear and speak), and multicast sessions (one sender, many receivers). The sessions may contain audio, video, or data. SIP handles call setup, call management, and call termination and may use other protocols to do so, such as Real-time Transport Protocol ("RTP") for transporting real-time data and providing Quality of Service ("QoS") feedback, and the Real-Time Streaming Protocol ("RTSP") for controlling delivery of streaming media. SIP is an application layer protocol and can run over the user datagram protocol ("UDP") or the transport control protocol ("TCP"), for example.

Network monitoring solutions are well known in the art and widely employed by service providers. One of the most widely used performance indicators by various network monitoring solutions is a call drop rate. Generally, this performance metric enables measurement of both the quality of a service provided by a network as well the end user experience. Current network monitoring solutions measure call drop rates based on the failure codes received either from the handset or the network, which indicate a failure condition that resulted in tearing down of the call in progress. Furthermore, these monitoring solutions only consider the failure codes to categorize a voice call as a dropped call. It should be noted that the cause codes that are triggered when a user voluntarily ends a call (e.g., "User Triggered" or "Normal Call Clearing" cause codes) are always treated as successful terminations of the calls. However, this treatment of user triggered call tear down as successful calls is very optimistic in nature and often does not represent the true user quality of experience.

Accordingly, it is desirable to have network monitoring systems capable of more accurate detection and reporting of user triggered call drops.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method for detecting user triggered call drops includes identifying one or more user terminated calls from a plurality of monitored calls. Signaling information associated with the identified user terminated calls is correlated with media channel information associated with the identified user terminated calls. A determination is made if termination of the one or more of the identified user terminated calls is related to quality of media across corresponding media channels. A predefined cause code is assigned to the one or more of the identified user terminated calls, in response to determining that the termination of the one or more of the identified user terminated calls is related to the quality of media across the corresponding media channels.

In another aspect, a network device for detecting user triggered call drops is configured to identify one or more user terminated calls from a plurality of monitored calls. The network device is further configured to correlate signaling information associated with the identified user terminated calls with media channel information associated with the identified user terminated calls. The network device is further configured to determine if termination of the one or more of the identified user terminated calls is related to quality of media across corresponding media channels and to assign a predefined cause code to the one or more of the identified terminated calls, in response to determining that the termination of the one or more of the user identified terminated calls is related to the quality of media across the corresponding media channels.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
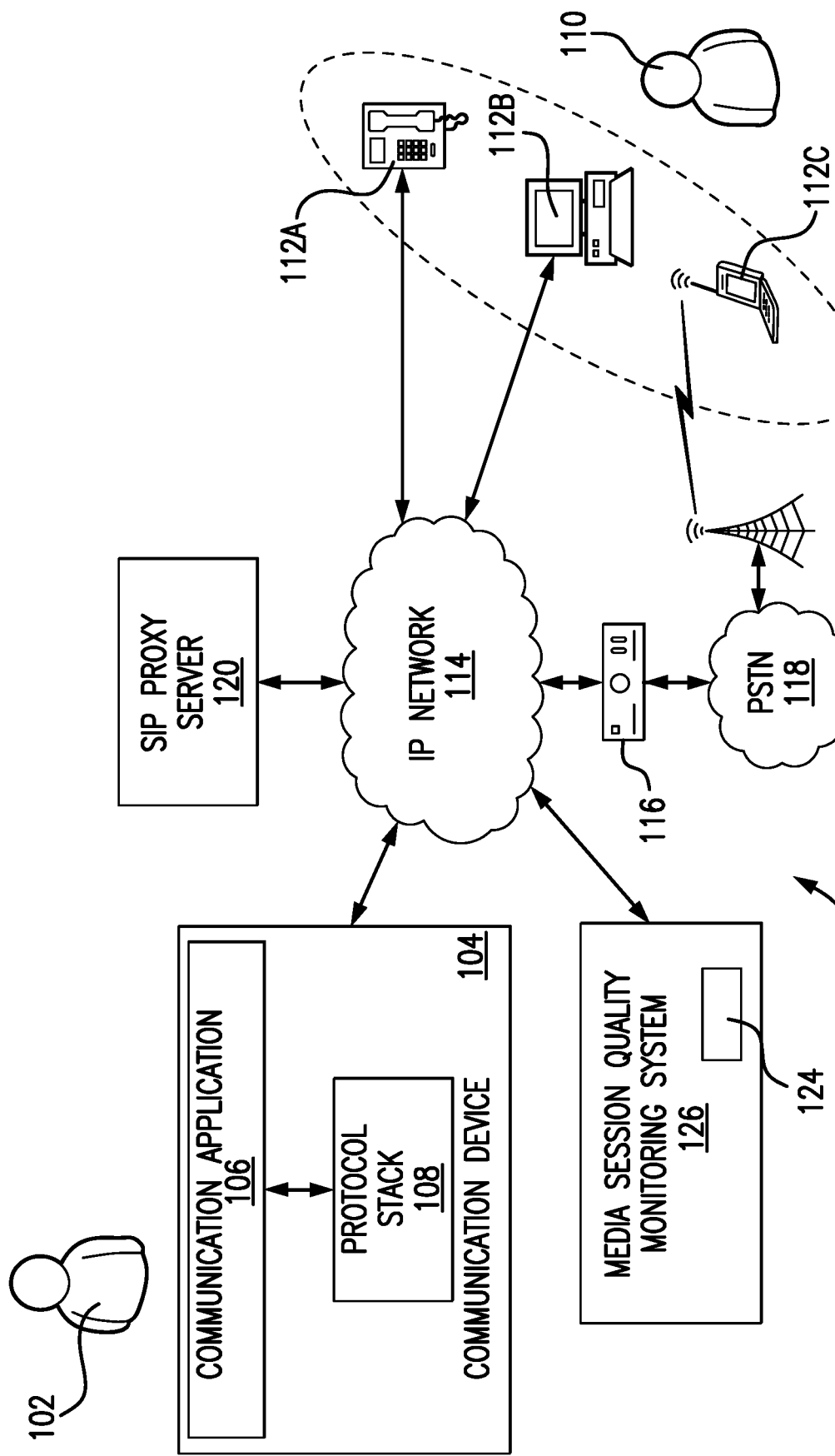
FIG. 1 is a block diagram showing aspects of an illustrative operating environment and several software components provided by the embodiments presented herein.

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

The following detailed description is directed to network monitoring solutions that analyze failure cause codes to categorize monitored calls. One of the most common failure cause codes in SIP protocol is the "RTP/RTCP Timeout" failure cause code. The UE starts an RTP/RTCP timer to monitor a downlink (DL) voice/video packet reception and the RTP/RTCP timer is restarted every time a new DL packet is received. Further, a UE continuously checks if the RTP/RTCP timer exceeds a RTP timeout threshold. For example, the RTP timeout threshold may be defined by an IMS of the UE. T In other words, when the UE detects that no media (e.g., audio RTP packets) was received for a time period exceeding the RTP timeout threshold, the UE force closes the wireless communication session (e.g., call in progress) by issuing the "RTP/RTCP timeout" cause code. The threshold level of the RTP/RTCP timer typically varies across different service providers but usually ranges between about 10 seconds and about 30 seconds.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, although many of the embodiments discussed below refer to communications via the SIP protocol, one of skill in the art may readily apply these systems and methods to communications via similar signaling protocols.

FIG. 1 shows an illustrative operating environment 100 including several software components for supporting SIP-based VoIP communications between a caller's communication device and a callee communication device, according to embodiments provided herein. As noted above, the SIP is a signaling protocol used by many VoIP devices to perform basic call-control tasks, such as session call setup, tear down, and signaling for features such as call hold, caller ID, conferencing, and call transferring. SIP provides the mechanisms to establish a VoIP call or session between two or more communication devices, or "endpoints," participating in the call.

The environment 100 illustrated in FIG. 1 includes a caller (first user) 102 utilizing a VoIP-enabled communication device 104. The caller's communication device 104 may be a computing device running a communication application 106. The communication application 106 may also be embedded in the firmware or operating system of the caller's communication device 104, such as the firmware of an IP telephone set. It will be appreciated that the caller's communication device 104 may be any VoIP-enabled communication device (including callee's communication devices 112A-112C described below) that uses SIP to establish voice or video calls, as will be described in more detail below.

The caller's communication device 104 includes a protocol stack 108 supporting SIP. The protocol stack 108 provides facilities to allow the communication application 106 to establish SIP-based VoIP calls with a callee (second user) 110 at one of the callee's communication devices 112A-112C over an IP network 114. The IP network 114 may be the Internet or a corporate local area network ("LAN") or wide-area network (WAN"). The callee's communication devices 112A-112C may include VoIP-enabled devices, such as an IP telephone set 112A or a computer device 112B connected directly to the IP network 114, as well as traditional telephone devices, such as a cellular phone 112C.

The callee's communication devices 112A-112C may also execute a communication program (e.g., communication application 106) to participate in the SIP-based VoIP call. A VoIP call between the caller's communication device 104 (which may include a traditional telephone device) and callee's communication device, such as the callee's cellular phone 112C, may be facilitated through a User Agent Server (UAS) 116. As a non-limiting example, the UAS 116 may comprise a VoIP gateway that bridges the IP network 114 with the Public Switched Telephone Network ("PSTN") 118.

The transfer of SIP signaling to setup the VoIP calls often takes place through one or more SIP proxy servers 120 located on the IP network 114. The SIP proxy server 120 acts as an intermediary between the endpoints, participating in the call to perform various routing functions. The media content (audio, conversational video or streaming video) of the call is exchanged directly between the endpoints participating in a SIP-based VoIP call using different communication channels than the SIP signaling. The exchange of media also utilizes different protocols, such as the RTP. The protocol stack 108 may also include support for these protocols to enable the direct exchange of media content between the caller's communication device 104 and the other endpoints participating in the VoIP call.

The network may also interface with a cellular or other wireless system, such as for example a 3G IMS (IP multimedia subsystem) system, in order to provide multimedia calls between a user or consumer in the household domain (e.g., using a SIP phone or H.323 terminal) and a mobile 3G, 4G or 5G telephone or personal media device (PMD) user via that user's radio access network (RAN).

Advantageously, various embodiments of the present invention contemplate a quality monitoring system that timely and accurately analyzes VoIP communication sessions. According to an embodiment of the present invention, this quality monitoring system may include, but not limited to, a server for monitoring data communication at various locations or links of the environment 100. A plurality of media communication sessions including data transfer sessions, Voice-over-IP (VoIP) and video communication (including video on demand) and streaming audio and video sessions, such as, but not limited to, interactive video conferencing sessions may be transmitted across the IP network 114.

As shown in FIG. 1, a media session quality monitoring system 126 may be communicatively connected to the IP network 114. In an embodiment of the present invention, the media session quality monitoring system 126 may comprise, or otherwise may cooperate with a call monitor software module 124. Call monitor 124 may comprise program instructions stored on one or more computer-readable storage devices, which may include internal storage on the media session quality monitoring system 126. Call monitor 124 may be, for example, a computer program or program component capable of capturing certain quality related information with respect to monitored calls, in real time. The call monitors 124 may be hardware, software, firmware or a combination thereof for monitoring data communication at various locations or links of the environment 100. One or more the call monitors 124 may be deployed at certain locations or links of the environment 100 to collect network data packets traversing the locations or links.

Figure 2:
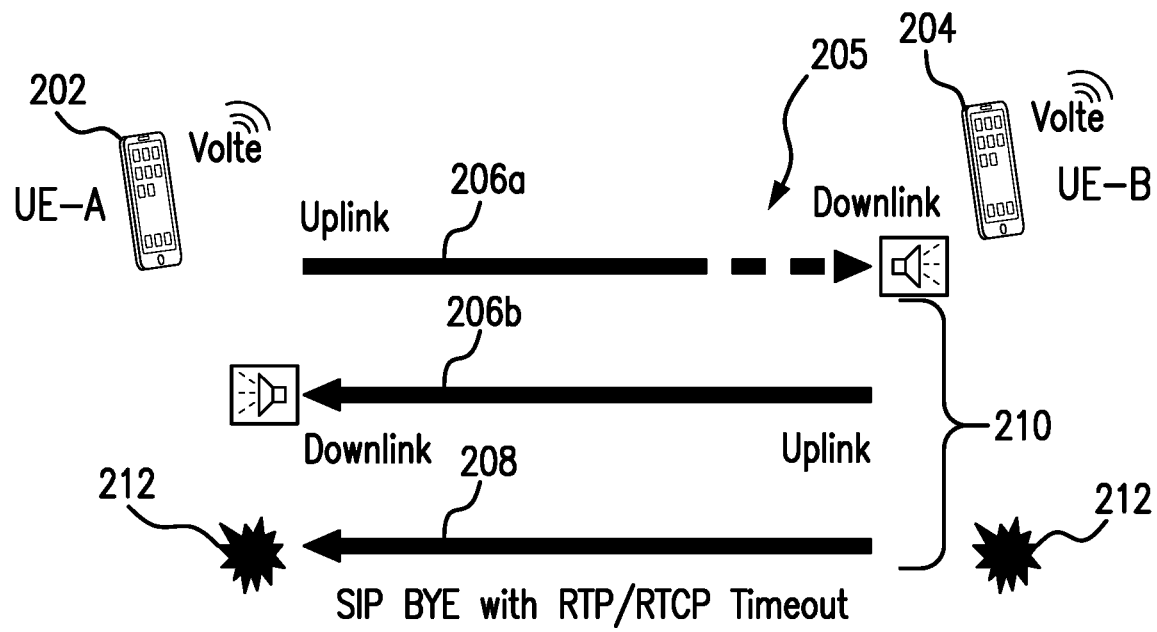
FIG. 2 is a diagram illustrating user equipment (UE) or network triggered call termination in a VoIP system.

FIG. 2 is a diagram illustrating UE or network triggered call termination in a VoIP system. For the purposes of illustration, the first UE 202 is first user's 102 communication device 104 and the second UE 204 is second user's 110 cellular phone 112C shown in FIG. 1. At some point during the wireless telecommunication session, the second UE 204 experiences media reception gap 205 of the DL media (e.g., audio RTP packets) 206a and the second user 110 is not able to hear the first user 102. The second user 110, although unhappy, still continues the call until RTP/RTCP timer of the second UE 204 exceeds its preconfigured RTP timeout threshold. Even though there are no gaps with respect to the uplink (UL) media 206b, in response to determining that the RTP/RTCP timer does exceed the RTP timeout threshold, the second UE 204 issues the SIP BYE signaling message 208 to the first UE 202. The SIP BYE message 208 includes "RTP/RTCP timeout" failure cause code which effectively force closes the voice call in progress. In this case, the call monitor 124 monitoring the SIP signaling exchange 210 between the first UE 202 and the second UE 204 counts the corresponding voice call as a failed call/call drop 212 and reports the corresponding voice call accordingly. In various embodiments, media may include audio/video data encapsulated as a selected one of Real-Time Protocol/Real-Time Control Protocol (RTP/RTCP) data, MPEG Transport Stream (MPEG-TS) data, Real-Time Messaging Protocol (RTMP) data, Advanced Systems Format (ASF) data, and MPEG-4 (MP4) fragment data.

Figure 3:
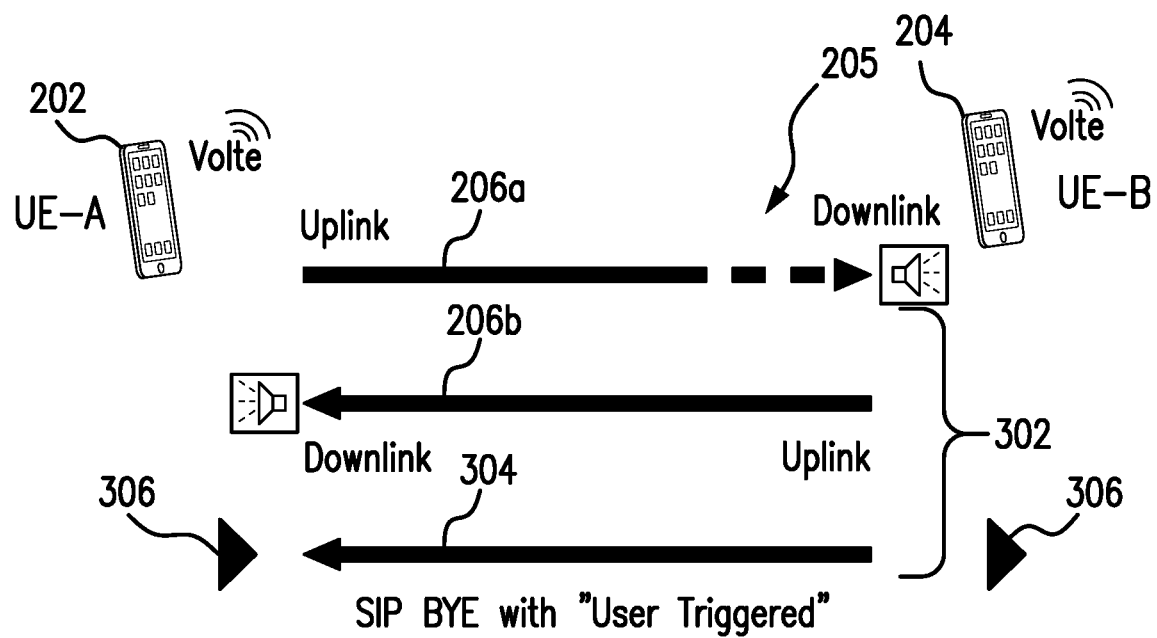
FIG. 3 is a diagram illustrating user triggered call termination in a VoIP system.

FIG. 3 is a diagram illustrating user triggered call termination in a VoIP system. This figure also illustrates a voice call between the first user's 102 first UE 202 and the second user's 110 second UE 204. Similarly, in this scenario, the second UE 204 experiences media reception gap 205 of the DL media 206a and the second user 110 is not able to hear the first user 102. However, in this case, the second user 110 being unhappy with the media reception gap 205 ends the voice call before RTP/RTCP timer of the second UE 204 reaches its preconfigured RTP timeout threshold. Since the second user 110 ends the voice call, the second UE 204 issues the SIP BYE signaling message 304 to the first UE 202. In this case, however, the SIP BYE message 304 includes "User Triggered" failure cause code which also results in termination of the voice call in progress. The call monitor 124 monitoring the SIP signaling exchange 302 between the first UE 202 and the second UE 204 counts the corresponding voice call as a successful call 306 and reports the corresponding voice call accordingly. However, from users' perspective, both of the scenarios (illustrated in FIGS. 2 and 3) should be counted as failed audio (or video) calls by the call monitor 124.

As noted above, the preconfigured threshold level of the RTP/RTCP timer typically varies across different service providers. However, the higher the value of this threshold the more likely users rather than UEs would terminate calls having prolonged media reception gaps or other call quality related issues. As a result of this disparity, traditional performance metrics utilized by currently available network monitoring solutions and related systems widely employed by service providers do not accurately capture the true end user experience nor do they represent the true quality of the network. Furthermore, some misrepresentative metric values could lead to extended troubleshooting, which wastes valuable resources. An embodiment of the present invention described below contemplates utilization of novel call drop metrics capable of capturing the true end user experience and capable of more accurately characterizing network quality.

Figure 4:
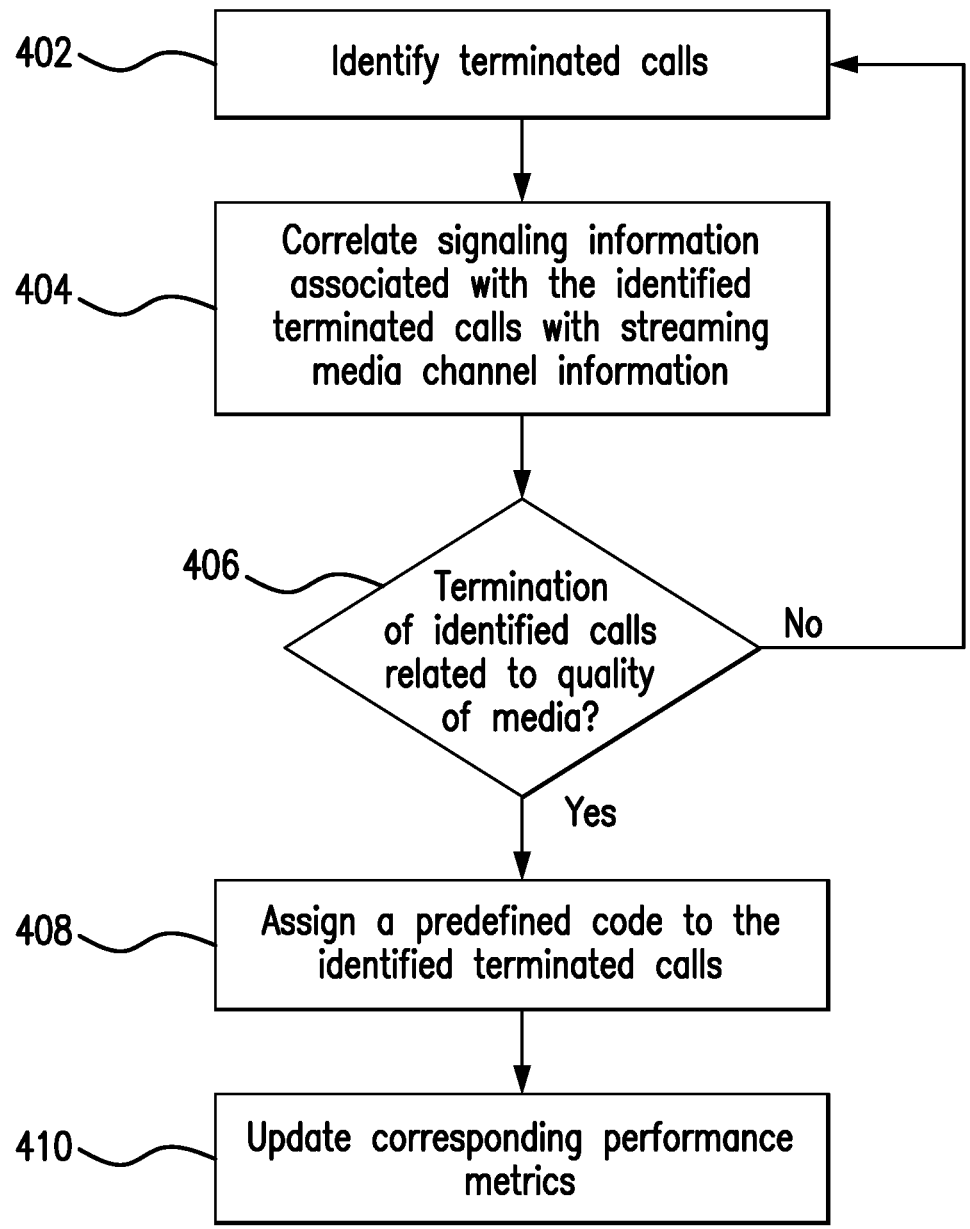
FIG. 4 is a flowchart illustrating operation of an embodiment of the present invention.

FIG. 4 is a flowchart illustrating operation of an embodiment of the present invention. Before turning to description of FIG. 4, it is noted that the flow diagram shown therein is described, by way of example, with reference to components shown in FIGS. 1-3, although these operational steps may be carried out in any system and are not limited to the scenario shown in the aforementioned figure. Additionally, the flow diagram in FIG. 4 illustrates an example in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more additional steps may be included.

At step 402, the call monitor 124 identifies terminated call sessions (audio, video or conference calls) between two or more users. In this step, the call monitor 124 may exclude terminated calls that were dropped when a UE enter an area with poor or no service and may also exclude calls that were dropped when a battery of a UE is low or completely discharged and the UE turns off automatically. In other words, in this step, the call monitor 124 only identifies user terminated call sessions.

At step 404, the call monitor 124 correlates signaling information associated with the identified terminated calls with media channel information. Generally, a communication session can be considered to consist of a media plane and a signaling plane. The media plane of the communication session is formed by media streams, while the signaling plane is formed by a signaling session. The media channel information includes voice, audio, and/or video information. A channel is defined herein as a concatenation of layers within the network to establish a path between two endpoints. A channel is generally the smallest subdivision of a transmission system. A channel may also be defined as a media-processing instance. The correlated signaling information may include call control information (e.g., call states of a VoIP call). In other words, the call monitor 124 analyzes the contents of each signaling packet associated with the terminated call session. An example of a session is a pair of RTP voice streams (UL and DL) between two IP phones. One technique that may be used by the call monitor 124 to analyze the performance of media channel information is counting the packets and their quality and understanding when one of the parties stops receiving packets leading to either gaps or one way media (OWM).

According to an embodiment of the present invention, at step 406, the call monitor 124 makes a decision for each identified terminated call session regarding whether the termination of the call was related to quality of media based on the correlation performed at step 404. In other words, when the call monitor 124 detects a "user triggered" call termination it makes an informed decision whether the analyzed call termination was related in any way to network performance based on the correlated network performance information. The network performance information may include media transmission rate and/or media transmission quality. For example, the call monitor 124 may determine media quality of uplink (with respect to the second UE 204) media channel 206*b* and determine media quality of downlink media channel 206*a*. More specifically, the call monitor 124 may determine if any of the devices participating in the analyzed call session had experienced abrupt voice delays associated with media reception gaps (e.g., media reception gap 205 shown in FIGS. 2 and 3) in either one or both directions. Furthermore, the call monitor 124 may analyze duration of the detected media reception gaps to determine the likelihood of poor media reception quality contributing to call session termination. For example, the call monitor 124 may determine whether any of the observed media reception gaps exceed a predefined threshold and/or may determine whether any of the media reception gaps occurred abruptly right before the session termination.

In response to determining that no identified terminated calls were related to quality of media (decision block 406, "No" branch), the call monitor 124 may return to step 402 to analyze another batch of user terminated calls. If the call monitor 124 determines that termination of one or more identified calls is caused by poor media quality (decision block 406, "Yes" branch), the call monitor 124 assigns a predefined failure cause code to such calls (step 408). In one embodiment, the call monitor may assign a "user triggered call drop" cause code indicative of session termination due to bad media quality.

At step 410, the call monitor 124 updates and reports corresponding network performance and/or call quality metrics. Advantageously, the media session quality monitoring system 126 counts the "user triggered call drop" failure cause code as a call failure/call drop.

In view of the above, embodiments of the present invention enable the network monitoring system to distinguish between a call where a party hangs up because the conversation is over and a call in which a party ends the conversation due to bad quality and consequently hangs up. Availability and accuracy of KPIs are as important as ever because KPIs obtained from monitoring systems are increasingly going to trigger network, business, and potentially revenue impacting decisions. Call drop rate is one of the most important KPIs monitored by a service provider. A considerable amount of time and money is spent by various service providers to ensure that call drops are addressed and resolved in a timely fashion. Call drops directly impact end customers and are typically one of the major factors affecting customer churn, which each service provider strives to minimize. With flattening tariffs, network quality and user experience become particular differentiating factors for service providers in their aspiration to improve their service and grow their customer base. Embodiments of the present invention enable service providers to better understand the end user experience, to more efficiently use network resources and to improve the network quality by properly characterizing monitored events which are not flagged as failures by currently available network monitoring solutions. More specifically, these embodiments disclose a method utilizing novel call drop metrics capable of capturing the true end user experience and capable of more accurately characterizing network quality. This new method can benefit service providers in improving their network quality and can help improving user experience resulting in an improved customer royalty.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN) or WLAN, or the connection may be made to an external computer (for example, through the Internet using an Internet Service Provider).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for detecting user triggered call drops, the method comprising:
   monitoring network data packets associated with calls on a telecommunications network;
   capturing network data packets from the telecommunications network associated with a plurality of monitored calls; and
   analyzing the captured network data packets, wherein analyzing includes:
   identifying one or more user terminated calls from the plurality of monitored calls;
   correlating signaling information associated with the identified user terminated calls with media channel information associated with the identified user terminated calls;
   determining if termination of the one or more of the identified user terminated calls is related to quality of media across corresponding media channels by analyzing duration of detected media reception gaps to determine if a predetermined threshold has been exceeded and determine if a media gap accrued prior to session termination; and
   assigning a predefined cause code to the one or more of the identified terminated calls, in response to determining that the termination of the one or more of the user identified terminated calls is related to the quality of media across the corresponding media channels includes determining if the termination of the one or more of the identified user terminated calls is related to the quality of media based on a failure cause code associated with a call terminating signaling message.

2. The method of claim 1, wherein the plurality of monitored calls comprises a plurality of Voice over IP (VOIP) calls.

3. The method of claim 1, wherein determining if termination of the one or more of the identified terminated calls is related to quality of media across corresponding media channels further comprises determining media quality of one or more uplink media channels and determining media quality of one or more downlink media channels.

4. The method of claim 3, wherein determining if termination of the one or more of the identified user terminated calls is related to quality of media across corresponding media channels further comprises determining if termination of the one or more of the identified user terminated calls occurred prior to a timer exceeding a predefined timeout value configured for one or more User Equipment (UE) devices terminating an identified user terminated call.

5. The method of claim 4, wherein streaming data transmitted over the media channels includes audio/video data encapsulated as a selected one of Real-Time Protocol/Real-Time Control Protocol (RTP/RTCP) data, MPEG Transport Stream (MPEG-TS) data, Real-Time Messaging Protocol (RTMP) data, Advanced Systems Format (ASF) data, and MPEG-4 (MP4) fragment data.

6. The method of claim 5, wherein determining if termination of the one or more of the identified user terminated calls is related to quality of media across corresponding media channels comprises identifying a media reception gap during which there was no delivery of the streaming data over the one or more downlink media channels or identifying a media reception gap during which there was no delivery of the streaming data over the one or more uplink media channels and comparing duration of the identified media reception gap with a predefined threshold value.

7. The method of claim 1, further comprising updating one or more network performance metrics based on the assigned predefined cause code.

8. The method of claim 1, wherein the predefined cause code is indicative of a network failure.

9. A network device for detecting user triggered call drops, comprising:
a media session quality monitoring device coupled to a telecommunications network configured to:
monitor network data packets associated with calls on a telecommunications network;
capture network data packets from the telecommunications network associated with a plurality of monitored calls; and
analyze the captured network data packets, wherein analyzing includes:
identify one or more user terminated calls from a plurality of monitored calls;
correlate signaling information associated with the identified user terminated calls with media channel information associated with the identified user terminated calls;
determine if termination of the one or more of the identified user terminated calls is related to quality of media across corresponding media channels by analyzing duration of detected media reception gaps to determine if a predetermined threshold has been exceeded and determine if a media gap accrued prior to session termination; and
assign a predefined cause code to the one or more of the identified terminated calls, in response to determining that the termination of the one or more of the user identified terminated calls is related to the quality of media across the corresponding media channels includes determining if the termination of the one or more of the identified user terminated calls is related to the quality of media based on a failure cause code associated with a call terminating signaling message.

10. The device of claim 9, wherein the plurality of monitored calls comprises a plurality of Voice over IP (VOIP) calls.

11. The device of claim 9, wherein the network device configured to determine if termination of the one or more of the identified terminated calls is related to quality of media across corresponding media channels further comprises the network device configured to determine media quality of one or more uplink media channels and configured to determine media quality of one or more downlink media channels.

12. The device of claim 11, wherein the network device configured to determine if termination of the one or more of the identified user terminated calls is related to quality of media across corresponding media channels further comprises the network device configured to determine if termination of the one or more of the identified user terminated calls occurred prior to a timer exceeding a predefined timeout value configured for one or more User Equipment (UE) devices terminating the identified user terminated call.

13. The device of claim 12, wherein streaming data transmitted over the media channels includes audio/video data encapsulated as a selected one of Real-Time Protocol/Real-Time Control Protocol (RTP/RTCP) data, MPEG Transport Stream (MPEG-TS) data, Real-Time Messaging Protocol (RTMP) data, Advanced Systems Format (ASF) data, and MPEG-4 (MP4) fragment data.

14. The device of claim 13, wherein the network device configured to determine if termination of the one or more of the identified user terminated calls is related to quality of media across corresponding media channels further comprises the network device configured to identify a media reception gap during which there was no delivery of the streaming data over the one or more downlink media channels or configured to identify a media reception gap during which there was no delivery of the streaming data over the one or more uplink media channels and configured to compare duration of the identified media reception gap with a predefined threshold value.

15. The device of claim 9, wherein the network device is further configured to update one or more network performance metrics based on the assigned predefined cause code.

16. The device of claim 9, wherein the predefined cause code is indicative of a network failure.

* * * * *